May 21, 1968     E. B. ROMBERG     3,384,816
ANGULAR MEASUREMENT DEVICE
Filed Feb. 13, 1962     2 Sheets-Sheet 1
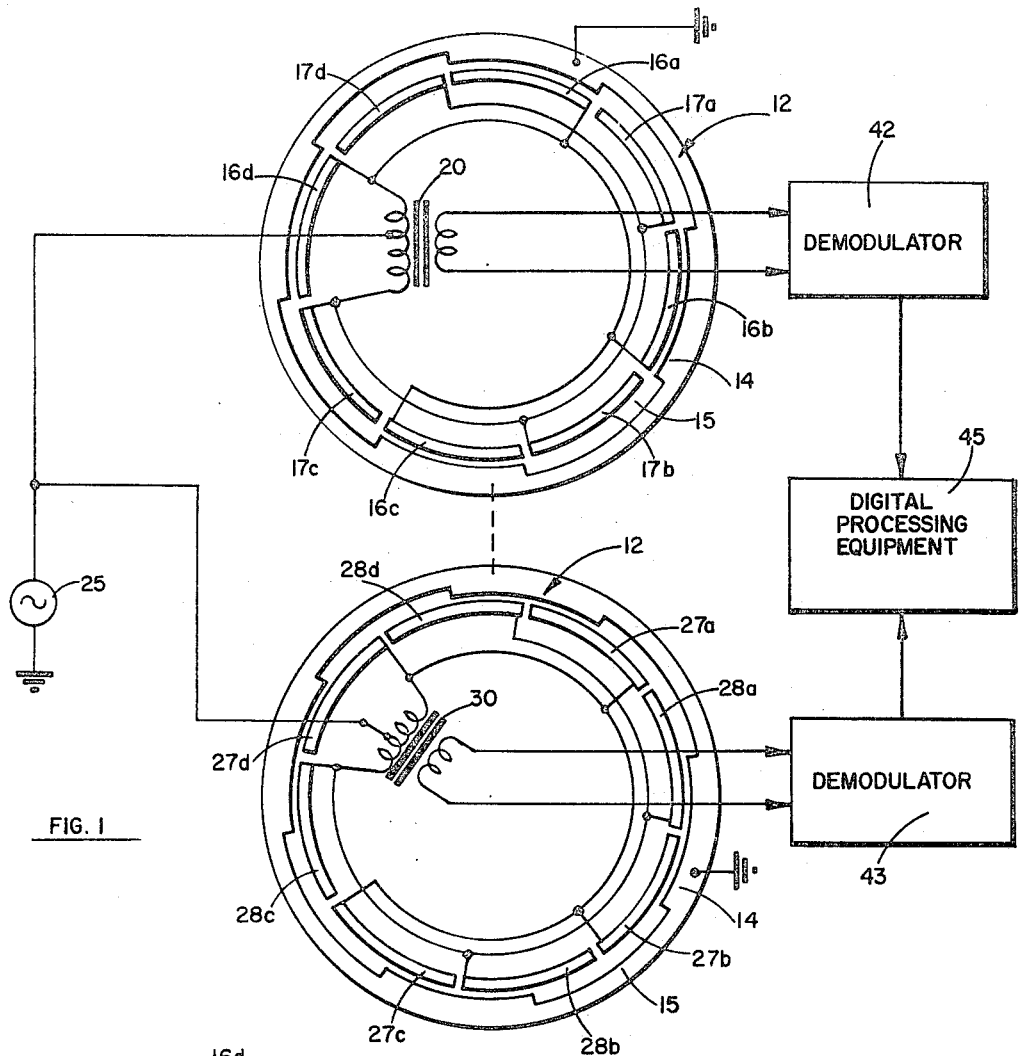
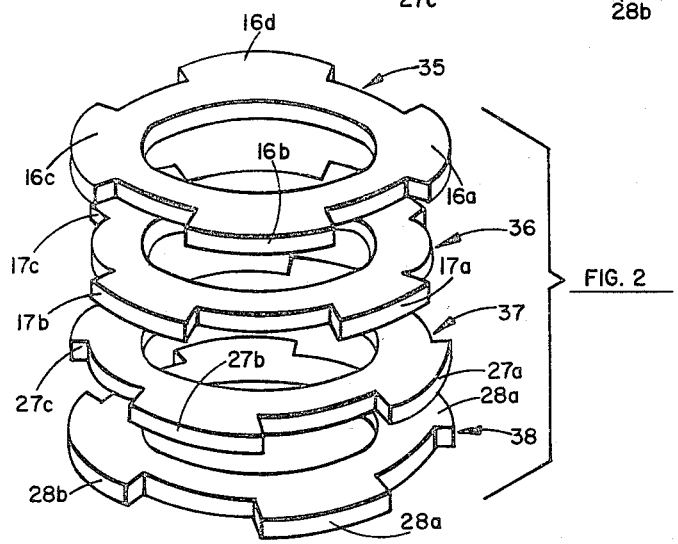
INVENTOR.
EDGAR B. ROMBERG
BY
ATTORNEY May 21, 1968  E. B. ROMBERG  3,384,816
ANGULAR MEASUREMENT DEVICE Filed Feb. 13, 1962  2 Sheets-Sheet 2

INVENTOR.
EDGAR B. ROMBERG
BY
*Edward A. Sokolski*
ATTORNEY

United States Patent Office 3,384,816
Patented May 21, 1968

3,384,816
ANGULAR MEASUREMENT DEVICE
Edgar B. Romberg, Whittier, Calif., assignor to North American Rockwell Corporation, a corporation of Delaware
Filed Feb. 13, 1962, Ser. No. 173,026
13 Claims. (Cl. 324—70)

This invention relates to a capacitive pickoff device and more particularly to such a device providing a digital output signal in accordance with the relative motion between two members.

A capacitive pickoff system may be utilized to detect relative rotation between two members. In such a device, a digital output signal may be generated by providing a plurality of tooth-like projections on a rotating member which pass in close proximity to similar tooth-like projections on the stationary member. Good resolution can be obtained in this type of device by providing a large number of tooth-like projections around the adjacent portions of the stationary and moving members. This general type of device can be utilized to sense the velocity of shaft rotation or the total amount of shaft rotation of a device such as that described in Patent No. 2,964,949, issued Dec. 20, 1960, entitled, Induction Velocity Meter, inventor D. E. Wilcox, assignee North American Aviation, Inc.

In the type of device described in this patent, total shaft rotation may be precisely determined to provide a highly accurate digital output signal for use in an inertial navigation system. Not only is precision operation required but also extremely high reliability over long periods of operation. Devices of the capacitive pickoff variety for performing this function are known in the prior art. However, most of these devices either do not have the inherent accuracy required for this type of application or, due to their complexity, do not have the necessary reliability. The device of this invention not only has the required accuracy necessary for use with a precision instrument such as a velocity meter but also has a simplicity of construction which tends toward very high reliability. No slip-ring commutators or other moving electrical parts are required which might breakdown under long periods of operation. The construction is such that stray capacitive pickup which might lead to inaccuracies in the output signal are minimized. Further, a digital output signal having a minimum value approaching zero which is readily adaptable for digital processing is generated by the device of the invention.

It is therefore an object of this invention to provide an improved capacitive pickoff device having a digital output signal.

It is a further object of this invention to improve the accuracy of a capacitive pickoff device for sensing relative motion between two members.

It is a further object of this invention to increase the reliability of capacitive pickoff devices without sacrificing the accuracy thereof.

It is a still further object of this invention to provide a highly accurate capacitive pickoff device having a digital output signal which is of very simple construction.

Other objects of this invention will become apparent from the following description taken in connection with the accompanying drawings of which:

FIG. 1 is a schematic diagram illustrating the device of the invention;

FIG. 2 is a schematic diagram illustrating the relative positioning between the stationary ring-like members of the preferred embodiment of the device of the invention.

Figure 3:
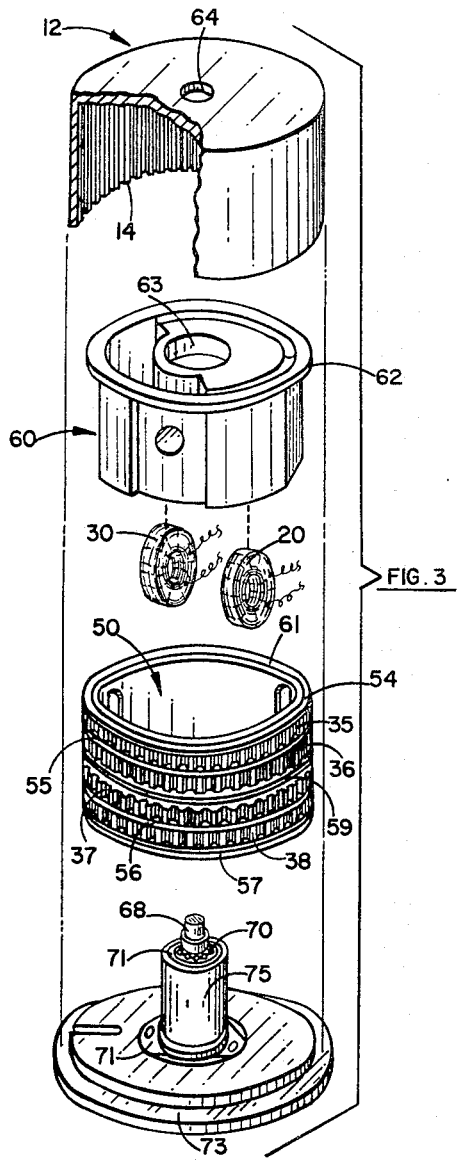
FIG. 3 is an exploded perspective view of a preferred embodiment of the device of the invention.

The device of the invention comprises an electrically conductive rotatable member having a plurality of tooth-like projections formed therein and two pairs of similar electrically conductive ring-shaped members having a plurality of similar tooth-like projections, the ring-shaped members being displaced from each other along the rotation axis of the rotatable member with their tooth-like projections in close proximity to those formed in the rotatable member. Means are provided for fixedly mounting the ring-shaped members on a support. The projections on each of the ring-shaped members are positioned in 180° space phase relationship with the projections of its paired member and in 90° or 270° space phase relationship with the projections of the non-paired members.

A pair of transformers are provided to detect relative motion between the rotatable and fixed members. A reference signal is fed to the center tap of the primary winding of each transformer, while the ends of each transformer are each connected to an associated one of a pair of the ring-shaped members. An output signal is taken from the secondary winding of each of the transformers.

The output signals produced with relative rotation between the rotatable and fixed members constitutes a carrier signal which is modulated through one modulation cycle as each tooth-like projection on the rotatable members passes between two successive projections on the fixed member. The output signals from the transformers are demodulated and the resultant two signals are a series of pulses whose frequency is in accordance with the velocity of relative rotation between the fixed and rotatable members. These two signals are in quadrature phase relationship with each other, one of the signals phase leading the other for relative rotation in one direction with the opposite being true for opposite relative rotation. The transformers are effectively isolated from stray pickup by means of a shielding stator case in which they are enclosed. The rotatable member is suitably coupled to rotatable drive shaft which in turn is connected to a device whose velocity of rotation or total amount of rotation is to be measured.

No direct electrical connections are required to the rotatable member by means of commutators and the like, the entire electrical coupling being accomplished by virtue of the capacitance between the rotatable and the fixed members. Each of the ring-shaped members is electrically conductive and resembles a gear ring. No insulation is required in the individual members between the projections formed therein. The entire unit is compactly assembled within the stator case, the ring-shaped members and the rotatable member all being in concentric relationship with each other.

Referring now to FIG. 1, a schematic diagram of the device of the invention is illustrated. Rotatable member 12 has a plurality of tooth-like projections 14 formed therein with spaces 15 therebetween. Tooth-like projections 16a–16d are formed in one of a pair of ring-shaped members while tooth-like projections 17a–17d are formed in the other of this pair of ring-shaped members. Projections 16a–16d, 17a–17d, and 14 are all similar in width. Likewise, the spaces between projections are similar in width. To facilitate the description, the tooth-like projections 17a–17d and 16a–16d which are formed in separate ring-like members of a pair are schematically shown adjacent to each other. It is to be clearly understood, however, that the paired ring-like members and the projections formed in each are displaced from each other along the rotation axis of the rotatable member 12 as shown in FIG. 2.

One end of the primary winding of transformer 20 is connected to one of the pair of ring-shaped members and therefore to all of the projections 16a–16d formed therein while the other end of transformer 20 is connected to the other of this pair of ring-shaped members and therefore to projections 17a–17d formed therein. A-C reference source 25 is connected to the center tap of the primary of transformer 20. Projections 14 in rotatable member 12 are similarly positioned relative to projections 27a–27d and 28a–28d formed on each of a pair of similar ring-like members. Projections 27a–27d are connected to one end of the primary winding of transformer 30 while projections 28a–28d are connected to the other end of the primary winding of transformer 30 with the center tap of this winding being connected to A-C reference source 25.

Projections 16a–16d are in 180° space phase relationship with projections 17a–17d with reference to rotatable member 12 while projections 27a–27d and 28a–28d are in similar space phase relationship to each other. Projections 27a–27d and 28a–28d are in quadrature space phase relationship with projections 17a–17d and 16a–16d. This space phase relationship can be more clearly seen by reference to FIG. 2 which illustrates the ring-like members 35–38 in their true fixed relative positions. All of these members as illustrated in FIG. 3 are fixedly attached to insulating member 50 which is part of the non-rotatable member. As can be seen, the tooth-like projections of members 35 and 36 are in 180° space phase relationship with each other as are the tooth-like projections of members 37 and 38 with the projections of members 37 and 38 being in space quadrature relationship with the projections of members 35 and 36. The secondary winding of transformer 20 is connected to demodulator 42 while the secondary winding of transformer 30 is connected to demodulator 43. The outputs of demodulators 42 and 43 are pulse signals in quadrature phase relationship with each other, their frequency being a function of the speed of rotation of rotatable member 12 and the number of pulses being a function of the total amount of rotation of rotatable member 12. The quadrature related signals are both fed to digital processing equipment 45 for appropriate shaping and gating in a logical gating network. A logical gating network such as that described in Patent No. 2,993,279, issued July 25, 1961, J. L. Bower inventor, entitled Photoelectric Gauge, may be used to produce output signals in accordance with the direction of rotation of rotor 12. As described in this patent in connection with FIG. 9 thereof, a logical gating circuit can be utilized to produce a train of output pulses on one output line or another depending upon which of the input signals phase leads the other. Digital processing equipment may also include a conventional digital computer for appropriately processing the digital signals derived. The device shown in FIG. 1 thus provides a digital output signal in accordance with the speed and direction of rotation of a rotatable member relative to a fixed member. The output signal derived may be appropriately integrated in digital processing equipment by techniques well known in the art.

Referring now to FIG. 3, a prefered embodiment of the device of the invention is illustrated. Rotor 12 has a plurality of tooth-like projections 14 formed along the inner circumference thereof. Rotating member 12 is of hollow cylindrical shape. The tooth-like projections 14 run the entire length of the inner wall of rotor 12. Ring-like members 35–38 which have tooth-like projections formed along the outer circumference thereof and resemble cylindrical gears are fixedly attached to insulating member 50 by cementing or other suitable means. The rims of electrically conductive ring-shaped members 35–38 are insulated from possible contact with each other and other conductive surfaces by means of insulating rings 54–57. Electrically conductive shielding plate 59 is fixedly attached to insulating member 50 approximately halfway between members 36 and 37 to provide an electrostatic shield which prevents the coupling of signals between the two pairs of ring-shaped members. Toroidal transformers 20 and 30 are mounted within stator shield 60 by cementing or other suitable means with their central axes substantially as indicated in FIG. 3 relative to stator shield 60. Insulating member 50 upon which the ring-shaped members 35–38 are mounted fits over the circumference of stator shield 60 in concentricity therewith to provide an insulating sleeve between the ring-shaped members and the stator shield with the top edge 61 of insulating member 50 abutting against the upper rim 62 extending out from stator shield 60.

Shaft 68 is rotatably mounted in bearing 70 which is fixedly supported on adapter 71 which in turn is fixedly attached to base unit 73. Insulating sleeve 75 fits over adapter 71 and is fixedly attached thereto. Insulating sleeve 75 fits within and is fixedly attached to the central portion 63 of stator shield 60 and insulates this stator portion from rotor 12 as well as base member 73. Shield member 60 surrounds transformers 20 and 30 and is connected to their center taps to effectively shield the transformers from stray pickup. The appropriate leads of transformers 20 and 30 are connected to the ring-shaped members 35–38 by soldering or other suitable means. Shaft 68 is fixedly attached to rotor 12 by cementing with the end portion of the shaft fitting into aperture 64 formed in rotor 12.

The embodiment of the device of the invention as illustrated in FIG. 3 thus provides a simple and highly compact device. In a working model of the embodiment illustrated in FIG. 3, the spacing between the projections on rotatable member 12 and the ring-shaped members 35–38 is approximately .005 inch to provide fairly high effective capacitive coupling.

The device of this invention may be characterized as an angular measurement device for generating a signal which is a measure of the rotation of a first mechanical member 12 relative to a second mechanical member 73. A plurality of electrically conductive annular members 35, 36, 37, and 38 are mounted on the second mechanical member 73. Each of the annular members 35, 36, 37, 38 have radially extending conductive projections (16a, 16b, 16c, 16d, for example) around their outer periphery. The projections are within a first predetermined radius from the axis of circular symmetry of the annular members. The annular members 35, 36, 37, and 38 are coaxial and electrically insulated, for example, by means of insulating rings 54, 55, 56, and 57.

Rotatable member 12 forms an enclosure which is adapted to surround the plurality of annular members 35, 36, 37, and 38. The enclosure is defined by a cylindrical wall whose radius is greater than the above mentioned predetermined radius, which is necessary if enclosure 12 is to surround members 35, 36, 37, and 38 without touching. The cylindrical wall supports a plurality of conductive radially inwardly projecting members 14 which are circumferentially disposed about the axis of the cylindrical wall of member 12. The inner radius of the inwardly projecting members 14 is greater than the first predetermined radius to allow clearance between members 14 and the projections on members 35, 36, 37, and 38. In a preferred embodiment of the invention, the member 12 is electrically conductive to connect the projections 14. If the member 12 is not conductive, the members 14 must be connected electrically together.

A bearing means 70 supports member 12 relative to member 73 with the cylindrical inner wall of member 12 concentric with the axis of the annular members 35, 36, 37, and 38.

In some devices the rotatable member 12 would need to be balanced on its supporting shaft. However, if the rotations were slow such a balancing would not be necessary.

The stationary member 73 may be characterized as positioned inside of the member 12 and supporting at least two sets 16a, 16b, 16c, 16d, and 17a, 17b, 17c, 17d of conductive elements which are radially projecting outward a distance which remains interior to a cylinder (a geometrical cylinder, not a mechanical element) which is coaxial with and has a smaller radius than a cylinder which defines the innermost radius of members 14. Each of the sets of conductive elements contain at least one element. The elements of each of the sets are axially spaced from the elements of each of the other sets and the elements of each set are connected conductively to the other elements of the same set.

In a preferred embodiment, there are at least two elements 14 which are substantialy identical and uniformly circumferentially disposed about the axis of member 12. Further, in a preferred embodiment, the stationary member has four sets of substantially identical conductive elements 35, 36, 37, and 38 with the number of elements in each of the sets the same. The conductive elements in a preferred embodiment, in each of the sets are substantially uniformly circumferentially distributed about the common axis of circular symmetry of members 35, 36, 37, and 38.

Further, in the most preferred embodiment of this invention, the angular position about the common axis of the conductive elements of the second set is in 180° space-phase relative to the conductive elements of the first set. The angular position of the conductive elements of the fourth set is in 180° space-phase relative to the conductive members of the third set. The conductive elements of the third set are angularly positioned in 90° space-phase relative to the conductive element of the second set. That is, as shown in FIG. 1, the members of the first set are connected to opposite ends of transformer 20 to generate electrical signals which are 180° out of phase as member 12 turns. The electrical signals generated by the third and fourth sets are connected to opposite ends of the primary winding of transformer 30 to generate electrical signals which are 180° out of phase as member 12 turns. The signals generated by transformers 20 and 30 are 90° out of phase with each other.

To further enhance the operation of the device of the invention the L/C circuit formed by the transformers and the capacitance between the rotatable and ring-shaped members is designed to provide good modulation nulls in situations where the modulation frequency is fairly close to the carrier frequency. This end result is achieved by making the effective reactance of the L/C circuit formed by the windings of transformer 30 and the pickoff plates capacitive at the frequency of A-C source 25 and equal to the effective A-C resistance of the circuit which is determined primarily by the core losses of the toroidal transformer. In effect, by this means, the output signal is phase shifted 45 degrees and the net result is to equalize the amplitude of the side bands produced by the suppressed carrier modulation. Under ordinary circumstances, with proximate carrier and modulation frequencies, the upper and lower side bands tend to differ appreciably in their magnitude due to the inability to achieve broad enough response in the L/C circuit over the modulation band. This makes for poor modulation nulls which in turn makes it difficult to handle the output signal digitally in the face of noise. By tuning the circuit in the fashion described above in an operative embodiment of the device of the invention, modulation minimums are held within 5% of the maximum amplitude of the modulation signal withm a carrier frequency of approximately 5 kc. and a modulation frequency in the neighborhood of 1 kc.

The device of this invention thus provides a simple and compact yet highly reliable and precise digital readout mechanism for measuring either the velocity or distance of rotation of a rotating shaft. By utilizing a great number of tooth-like projections in the rotatable and fixed members, high resolution readout can be obtained. Simplicity of construction is achieved by axially displacing the ring-shaped members along the rotation axis of the rotor to provide co-operating pairs of capacitive pickoff plates. By such construction, the necessity for providing insulation between alternating teeth in obtaining a satisfactory readout signal is eliminated. This greatly facilitates the fabrication of the device of the invention. Stray capacitive pickup is minimized by providing highly effective shielding around the pickup transformers, the pickup plates and the leads therebetween and means are provided to produce more pronounced modulation nulls to make for a precise and highly readable digital output signal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a capacitive pickoff device, a hollow cylindrical member having a plurality of tooth-like projections formed around the circumference of the inner wall thereof, means for rotatably supporting said cylindrical member, first and second pairs of similar ring-shaped members having a plurality of similar tooth-like projections formed around the circumference of the outer walls thereof, means for fixedly supporting said ring-shaped members within said cylindrical member and in concentricity therewith with said ring-shaped member projections proximate to said cylindrical member projections, a separate transformer connected to each of said pairs of ring-shaped members, an A-C reference source connected between said transformers and said cylindrical member, a demodulator connected to receive the output of each of said transformers, and digital processing means connected to receive the outputs of said demodulators.

2. In an angular measurement device, a hollow cylindrical member having a plurality of tooth-like projections formed around the circumference of the inner wall thereof, means for rotatably supporting said cylindrical member, first and second pairs of similar ring-shaped members having a plurality of tooth-like projections formed around the circumference of the outer walls thereof, said projections formed in said ring-shaped members being similar in width to said cylindrical member projections, means for fixedly supporting said ring-shaped members within said cylindrical member and in concentricity therewith with said ring-shaped member projections proximate to said cylindrical member projections, said ring-shaped members being insulated from each other and from said cylindrical member, the projections of each of said ring-shaped members being positioned in 180° space phase relationship with the projections of its paired member and in 90° space phase relationship with the projections of its non-paired members, a separate transformer connected to each of said pairs of ring-shaped members, each said transformer having a center tapped primary winding, the ends of said primary windings each being connected to a separate one of said ring-shaped members, an A-C reference source, one terminal of said A-C source being connected to the center tap of each of said transformer windings, the other terminal of said source being connected to said cylindrical member, a demodulator connected to receive the output of the secondary of each of said transformers, digital processing means connected to receive the outputs of said demodulators, and shield means enclosing said transformers for minimizing stray pickup in said transformers.

3. An angular measurement device for generating a signal which is a measure of the rotation of a first mechanical member relative to a second mechanical member comprising:

at least four electrically conductive annular members having radially extending conductive projections around the outer periphery thereof, said projections being within a first predetermined radius from the axis of circular symmetry of said annular members, said annular members being axially spaced, coaxial, and electrically insulated from each other;

an electrically conductive rotatable member forming an enclosure adapted to surround said plurality of annular members, said enclosure being defined by a cylindrical wall whose radius is greater than said first predetermined radius and having a plurality of conductive radially inwardly projecting members circumferentially disposed about the axis of said last named cylinder, the inner radius of said inwardly projecting members being greater than said first predetermined radius;

bearing means for supporting said electrically conductive rotatable member concentrically with said annular members for unlimited freedom of rotation relative to said annular members.

4. A device as recited in claim 3 in which said outwardly radially projecting portions of said annular members are substantially the same size and shape and are uniformly circumferentially distributed about the outer periphery of said annular members;

in which said inwardly radially extending portions of said rotatable member are substantially identical and uniformly circumferentially distributed about the inner periphery of said cylindrical member;

and in which said rotatable member is mechanically balanced.

5. A device as recited in claim 3 and further comprising:

means connected to said rotatable member and said annular members for generating a periodic output signal whose frequency is a function of the velocity of relative rotation between said rotatable member and said annular members.

6. A device as recited in claim 5 wherein said means for generating an output signal comprises:

transformer means, electrically connected to said annular conductive members;

a voltage reference source connected between said transformer means and said rotatable member; and demodulator means connected to said transformer means.

7. In combination:

means forming a hollow first member having a circularly cylindrical inner surface defining an axis of circular symmetry;

at least two substantially identical conductive elements attached to said inner surface, radially inwardly projecting a distance which remains exterior to a predetermined first circular cylinder which is coaxial with said inner surface, said conductive elements being uniformly circumferentially disposed about said axis of circular symmetry and being conductively attached together;

a second member positioned inside of said first member and supporting at least four sets of substantially identical conductive elements having a common axis of circular symmetry coaxial with said first mentioned axis of circular symmetry, radially projecting outward a distance which remains interior to a second cylinder which is coaxial with and has a smaller radius than said first cylinder, each of said sets containing at least one element, the number of elements in each of said sets being the same, the elements of each of said sets being axially spaced from and coaxial with the elements of each of the other of said sets, the elements of each of said sets being conductively connected to the other elements of the same set, the conductive elements in each of said sets being substantially uniformly circumferentially distributed about said axis of circular symmetry; and means for allowing relative rotation about said axis of circular symmetry between said first and second members.

8. A device as recited in claim 7 and further comprising:

a first transformer, having a center tapped primary winding, a first end of said primary winding being connected to a first one of said sets of conductive elements on said second member, the second end of said primary winding being connected to a second one of said sets of conductive elements;

a second transformer having a center tapped primary winding, the first end of said primary winding being connected to a third one of said sets of conductive elements, the second end of said primary winding being connected to a fourth one of said sets of conductive elements;

the angular position about said common axis of the conductive elements of said second set being in 180° space-phase relative to the conductive elements of said first set, the angular position of the conductive elements of said fourth set being in 180° space-phase relative to the conductive members of said third set, the conductive elements of said third set being angularly positioned in 90° space-phase relative to the contive elements of said second set;

an A-C reference source, one terminal of said A-C source being connected to the center tap of each of said primary windings, the other terminal of said A-C source being connected to said conductive elements attached to said first member;

a demodulator connected to receive the signals appearing across the secondary winding of each of said transformers;

and shield means enclosing said transformers for minimizing stray pickup in said transformers.

9. The device recited in claim 8 and further comprising:

digital processing means connected to receive signals from the output of said demodulator.

10. A device as recited in claim 7 and further comprising:

means connected to said first and second members for generating a periodic output signal whose frequency is a function of the rotation rate of said first member relative to said second member.

11. A capacitive pickoff for detecting relative rotation between two members, said pickoff comprising a first cylinder of hollow construction mounted upon one of said members, a second cylinder coaxially disposed within, and spaced from, the inner surface of said first cylinder and mounted upon the other of said members, a first capacitor plate including a first plurality of congruent capacitive elements disposed at equal intervals around the circumference on a selected surface of one of said cylinders, conductive means mutually connecting said capacitive elements, second and third capacitor plates defined by first and second annular bands of conductive material having circumferentially spaced slots to form a plurality of congruent capacitive elements disposed at equal intervals on a selected surface of the other of said cylinders, the elements of the second and third capacitor plates being respectively equal in number to the elements in the first capacitor plate, the first annular band being axially spaced from the second annular band, the slots between adjacent elements in the second capacitor plate being disposed circumferentially intermediate successive slots in the third capacitor plate, said selected surfaces being mutually facing surfaces whereby said relative rotation causes an increase in capacitance between said first and second capacitor plates and a decrease in capacitance between said first and third capacitor plates, and electrical means connected to detect the total capacitive change and to produce an output signal proportional thereto.

12. A variable capacitance device including a rotatably mounted first member of conductive material in the shape of a hollow cylinder, the inner surface thereof defining a first plurality of equally spaced capacitive elements of constant width and length, a second member of nonconductive insulating material in the shape of a cylinder the length of which is not greater than the length of the first member, said second member being coaxially disposed within said first member such that the first member is free to rotate about the second member, first and second annular bands of conductive material mounted on the outer surface of said second member and having formed therein a plurality of circumferentially spaced slots to define second and third pluralities of capacitive elements, said elements being disposed at equal intervals around the outer surface of said second member, said second and third plurality of elements being respectively equal in number to and capacitively associated with said first plurality of elements, said first annular band being axially spaced from, and circumferentially offset from the second annular band whereby rotation of said first member relative to said second member produces an increase in the capacitance between the first member and said second plurality of elements and a decrease in the capacitance between said first member and said third plurality of elements.

13. Apparatus as defined in claim 12, wherein the elements in said first band are offset from the elements in said second band by a distance equal to the circumferential interval between adjacent elements in one of said first or second bands said interval being greater than half the circumferential dimension of said elements, whereby said increase in capacitance is equal to said decrease in capacitance.

References Cited

UNITED STATES PATENTS

| | | | |
|---|---|---|---|
| 2,367,017 | 1/1945 | Gardiner | 324—34 |
| 2,397,935 | 4/1946 | Gardiner | 73—136 |
| 2,400,112 | 5/1946 | Greibach | 324—118 |
| 2,455,345 | 11/1948 | Watt | 324—70 |
| 2,640,954 | 6/1953 | Sherwin | 340—200 |
| 2,848,667 | 8/1958 | Rolfe | 324—61 |
| 2,978,638 | 4/1961 | Wing et al. | 324—70 |
| 3,121,839 | 2/1964 | Malenick | 340—200 |
| 2,930,033 | 3/1960 | Webb | 340—200 |

FOREIGN PATENTS 787,933   12/1957   Great Britain.

RUDOLPH V. ROLINEC, *Primary Examiner.*

FREDRICK M. STRADER, WALTER L. CARLSON, RICHARD B. WILKINSON, *Examiners.*

MICHAEL J. LYNCH, *Assistant Examiner.*